United States Patent
Shirai

(10) Patent No.: US 7,181,198 B2
(45) Date of Patent: Feb. 20, 2007

(54) PROGRAM REWRITING SYSTEM AND METHOD FOR A PORTABLE TELEPHONE SET

(75) Inventor: Kouji Shirai, Tokyo (JP)

(73) Assignee: NEC Corporation (JP)

( * ) Notice: Subject to any disclaimer, the term of this patent is extended or adjusted under 35 U.S.C. 154(b) by 958 days.

(21) Appl. No.: 09/878,107

(22) Filed: Jun. 8, 2001

(65) Prior Publication Data

US 2001/0051519 A1  Dec. 13, 2001

(30) Foreign Application Priority Data

Jun. 12, 2000  (JP) .............................. 2000-175973

(51) Int. Cl.
H04L 12/58 (2006.01)
(52) U.S. Cl. ............... 455/412.1; 455/418; 455/419; 455/420; 379/355.02; 379/357; 714/6
(58) Field of Classification Search ........... 455/412.1, 455/418, 419, 420; 379/355.02, 357.05, 379/9.05, 357; 714/6
See application file for complete search history.

(56) References Cited

U.S. PATENT DOCUMENTS

| | | | | |
|---|---|---|---|---|
| 5,790,856 A | * | 8/1998 | Lillich | 717/163 |
| 5,799,200 A | * | 8/1998 | Brant et al. | 713/340 |
| 5,826,211 A | * | 10/1998 | Kobayashi | 701/115 |
| 5,933,595 A | * | 8/1999 | Iizuka et al. | 714/35 |
| 6,104,638 A | * | 8/2000 | Larner et al. | 365/185.33 |
| 6,212,278 B1 | * | 4/2001 | Bacon et al. | 380/240 |
| 6,317,755 B1 | * | 11/2001 | Rakers et al. | 707/204 |
| 6,425,050 B1 | * | 7/2002 | Beardsley et al. | 711/113 |
| 6,449,476 B1 | * | 9/2002 | Hutchison et al. | 455/418 |
| 6,574,213 B1 | * | 6/2003 | Anandakumar et al. | 370/349 |
| 6,622,017 B1 | * | 9/2003 | Hoffman | 455/419 |
| 2002/0077094 A1 | * | 6/2002 | Leppanen | 455/420 |
| 2003/0050940 A1 | * | 3/2003 | Robinson | 707/204 |

FOREIGN PATENT DOCUMENTS

| | | |
|---|---|---|
| JP | 4-345332 | 12/1992 |
| JP | 11-3223 | 1/1999 |
| JP | 2000-155684 | 6/2000 |

OTHER PUBLICATIONS

Japanese Office Action dated Jul. 27, 2004 (and English translation of relevant portion).

* cited by examiner

*Primary Examiner*—Matthew Anderson
*Assistant Examiner*—Minh Dao
(74) *Attorney, Agent, or Firm*—Dickstein, Shapiro, LLP.

(57) ABSTRACT

The invention provides a portable telephone set wherein a countermeasure can be taken against a bug of software by a user without the necessity for voluntary recovery by a maker. The portable telephone set has a hardware configuration which allows a user of the portable telephone set to perform an operation of downloading a modification portion of software from the outside such as a network and rewriting the software with the same. In this instance, the rewriting is performed not for the entire memory (ROM) space of the portable telephone set, but the software is divided and disposed into different blocks of the memory (ROM) space and the rewriting is performed in a unit of a block.

10 Claims, 3 Drawing Sheets

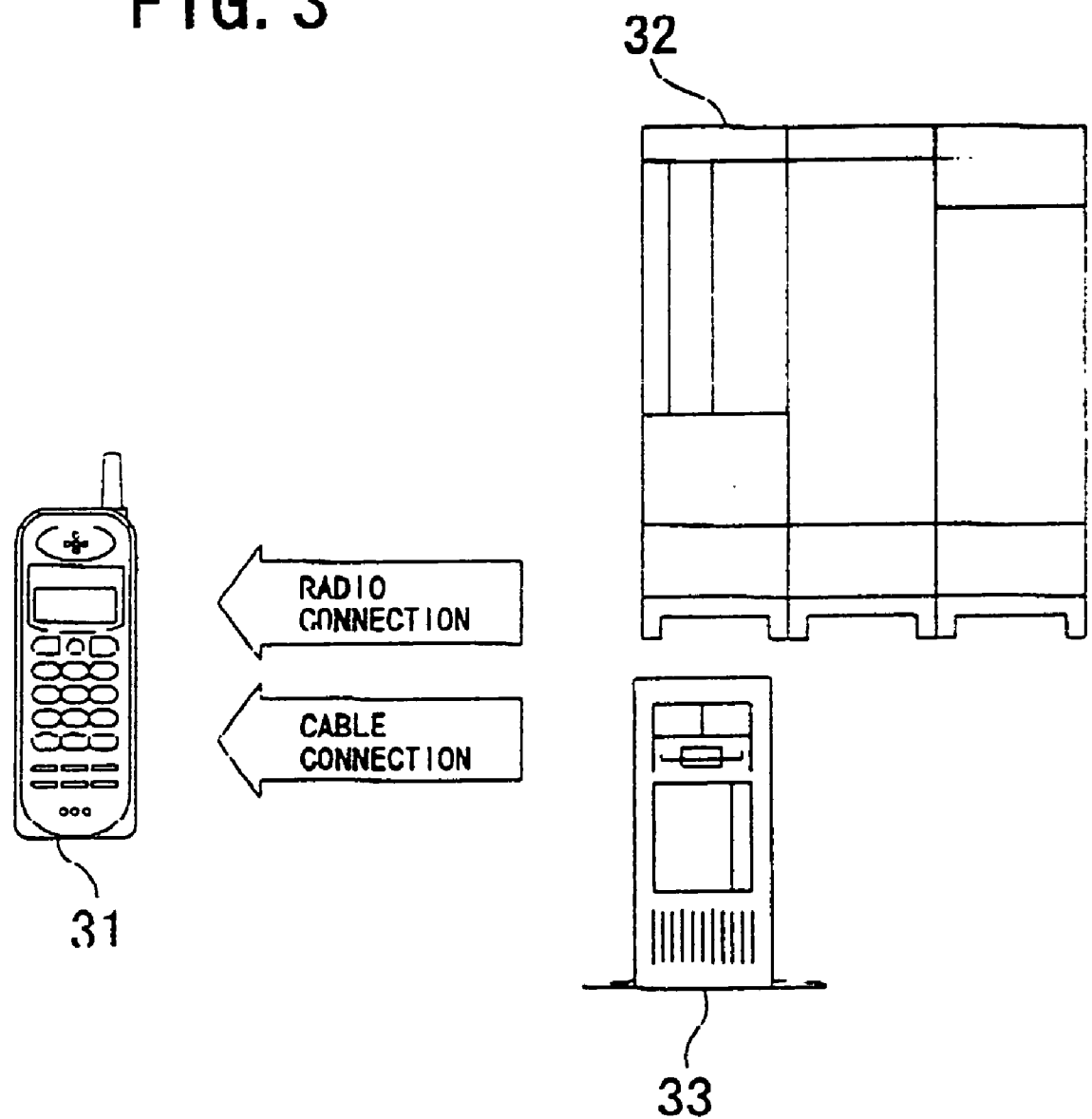

PROGRAM REWRITING SYSTEM AND METHOD FOR A PORTABLE TELEPHONE SET

BACKGROUND OF THE INVENTION

1. Field of the Invention

The present invention relates to a portable telephone set, and more particularly to a technique of rewriting part of program data of a main memory of a portable telephone set to correct bugs of software.

2. Description of the Related Art

In recent years, the number of subscribers of portable telephone sets has increased and is increasing suddenly, and also the manufactured number of portable telephone sets has been and is increasing similarly. Portable telephone sets not only have mere telephone functions but also begin to have functions as an information terminal. In order to implement functions as an information terminal, development not only of hardware but also of software has significant weight. From such significance of software, a bug upon shipment of portable telephone sets in most cases gives a critical blow to sales of the portable telephone sets.

Conventionally, if a bug of software occurs with a portable telephone set, then when the bug is found out and therefore the software must be corrected, data must be rewritten over the entire area of a memory (ROM) of the portable telephone set from a descriptive configuration of the software. Accordingly, in order to rewrite the software for portable telephone sets that have been placed on the market once, a countermeasure of voluntary recovery by the maker is taken. However, much time and labor are required for such voluntary recovery. Therefore, it is demanded to provide a portable telephone set whose software can be rewritten by a user in order to eliminate such voluntary recovery.

SUMMARY OF THE INVENTION

It is an object of the present invention to provide a portable telephone set wherein a countermeasure can be taken against a bug of software by a user without the necessity for voluntary recovery by a maker.

In order to attain the object described above, according to the present invention, there is provided a portable telephone set, comprising a read only memory in which program data are stored, a volatile memory for backing up the program data, and means operable when the portable telephone set is in a mode in which rewriting of the read only memory is allowed for writing part or all of the program data hacked up in the volatile memory replaceably into the read only memory.

Preferably, the program data stored in the read only memory are stored in a program arrangement in accordance with an arrangement of memory blocks of the read only memory and can be rewritten in a unit of a block.

With the portable telephone set, a user can take a countermeasure against a bug of the software even if a maker does not perform voluntary recovery, and modification to the software can be performed readily in a short time.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 3 is a schematic illustration illustrating a manner of use of the portable telephone set.

DESCRIPTION OF THE PREFERRED EMBODIMENT

Figure 1:
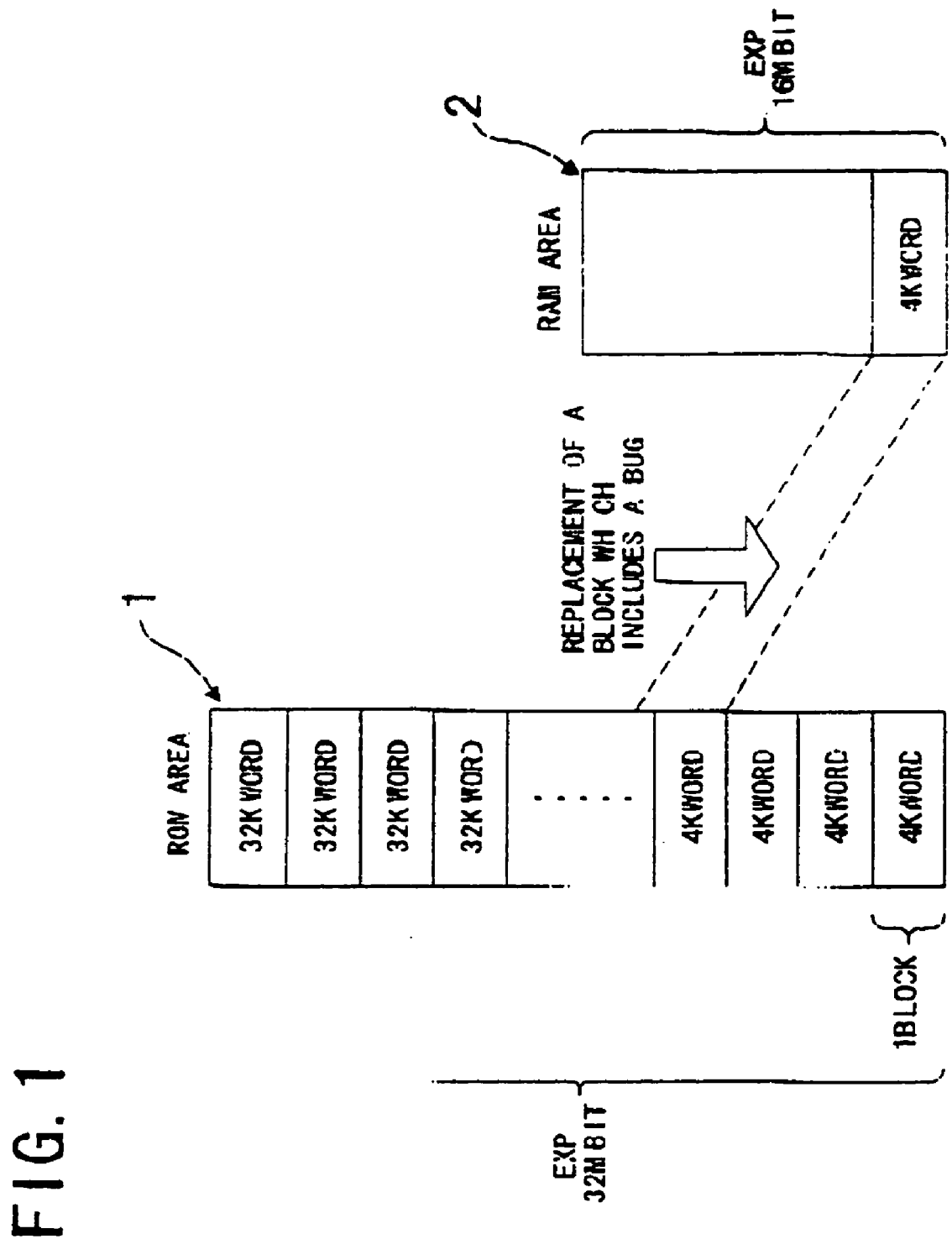
FIG. 1 is a diagrammatic view showing a configuration of a memory space of a portable telephone set to which the present invention is applied.

Referring first to FIG. 1, there is illustrated an example of configuration of a memory space of a portable telephone set to which the present invention is applied. The memory space includes a ROM section 1 and a RAM section 2. Data are stored in a unit of a block in the ROM section 1.

The ROM section 1 serves as a main program storage area of the portable telephone set, and has a storage portion of a large capacity but operates in a comparatively long access cycle (read/write cycle). A nonvolatile memory such as a flash memory whose storage data are not lost even if power supply from primary and secondary cells is disconnected is used for the ROM section 1. In order to rewrite the ROM section 1, it must be placed into a special mode called IPL mode.

The RAM section 2 is a program execution area of the portable telephone set, and has a small storage area but operates in a comparatively short access cycle. A volatile memory (flash-ROM) whose storage data are not lost even if the primary cell is disconnected but are lost if the secondary cell is disconnected is used for the RAM section 2. The RAM section 2 thus requires continual rewriting from a CPU.

The portable telephone set is shipped after a program is written into the memory space of the ROM section 1. Upon execution of the program, it is partly copied from the ROM section 1 into the RAM section 2. This is because it is intended to execute the program as fast as possible. It is to be noted here that, since the area of the RAM section 2 in the portable telephone set is usually smaller than the area of the ROM section 1, all data of the ROM section 1 cannot be placed into the RAM section 2. However, the software can be modified by arranging the program in accordance with the arrangement of internal blocks of the ROM section 1 and rewriting only a block of a modified portion of the program from the RAM section 2 into the ROM section 1.

Figure 2:
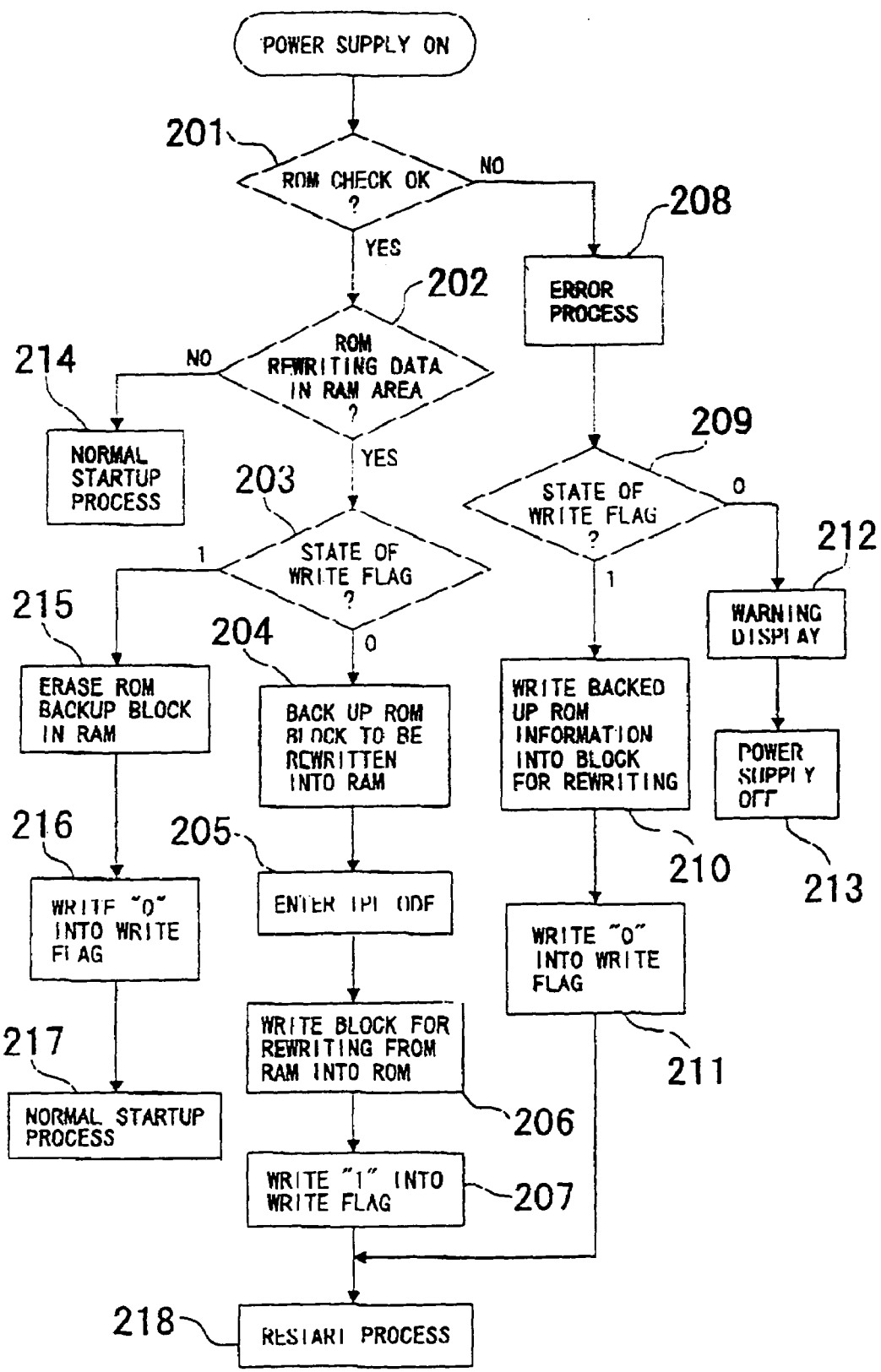
FIG. 2 is a flow chart illustrating a procedure of operation of the portable telephone set.

Now, operation of the portable telephone set is described with reference to a flow chart of FIG. 2. After power supply to the portable telephone set is switched on, it checks the ROM section 1 in step 201. If an error is detected, then the processing advances to step 208, but if no error is detected, then the processing advances to stop 202. In stop 202, it is discriminated whether or not rewriting data for the ROM section 1 is stored in the RAM section 2. If no rewriting data for the ROM section 1 is detected, then the processing advances to step 214, in which a normal startup process is executed.

If rewriting data for the ROM section 1 is detected in step 202, then the processing advances to stop 203, in which the state of a write flag is checked. If the write flag is "1", then the processing advances to step 215, but if it is "0" (default), then the processing advances to step 204, in which the portable telephone set stores the rewriting data for a ROM block into the RAM section 2 to backup the data. Thereafter, the portable telephone set enters an IPL mode in step 205, and writes the data backed up in the RAM section 2 into a corresponding block of the ROM section 1 in step 206. Thereafter, the portable telephone set sets the write flag to "1" in step 207, whereafter the processing advances to step 218, in which the portable telephone set executes a re-starting process.

On the other hand, it the processing advances from step 201 to step 208, the portable telephone set starts an error process in step 208. Then in step 209, the portable telephone set checks the write flag. If the write flag is "0", then the portable telephone set displays a warning of occurrence of an error in step 212 and then switches off the power supply in step 213. On the other hand, if the write flag is "1" in step 209, then the processing advances to step 210, in which the portable telephone set writes the backed up ROM information into the corresponding block of the ROM section 1. Thereafter, the portable telephone set resets the write flag to "0" in stop 211, whereafter the processing advances to step 218.

If the write flag is "1" in step 203 and the processing advances from step 203 to step 215, then the portable telephone set erases the ROM backup block in the RAM section 2 in step 215 and then resets the write flag to "0" in step 216. Thereafter, the portable telephone set performs the normal startup process in step 217.

The IPL mode mentioned hereinabove signifies a mode in which writing into the ROM area is enabled. The portable telephone set usually starts its program from the address 0 (called boot block) of the ROM section 1 after power supply is switched on. The portable telephone set discriminates here whether or not it should enter the IPL mode, and if it discriminates that it should perform a normal operation, then the address to be executed is jumped from the boot block to the top address of a block in which the normal operation program is placed. Therefore, the boot block is passed only once when the power supply is made available, but is not accessed again during the normal operation.

The write flag is used for discrimination of whether or not a modified program in the RAM section 2 has been written into the ROM section 1 already. As the write flag, a bit may be set in a region of the memory (RAM) or may be set in a register for exclusive use in an IC.

Conventionally, software written in an area of a ROM section is continuously stacked in the memory area without being partitioned for different functions, and therefore, if it is tried to rewrite the contents of the ROM area, then it is necessary to rewrite the entire area at a time because it cannot be partitioned for individual blocks of the ROM area. However, with the portable telephone set to which the present invention is applied, since the program is arranged in accordance with the arrangement of the internal blocks of the ROM section 1, even the user can modify the software readily by storing modification data for the program in a unit of a block into the RAM section 2 and then rewriting the program data only of a block which includes the modified data from the RAM section 2 into the ROM section 1.

Consequently, even if a software bug of portable telephone sets is detected, the maker need not perform voluntary recovery of the portable telephone sets. Further, software optimized for each type of portable telephone sets can be updated successively. Furthermore, even if a portable telephone set suffers from a software bug, it can fetch optimized software (i.e., a patch) every time to, improve the stability and operability thereof. Further, the memory (ROM) space can be used efficiently. In particular, when a user purchases a portable telephone set, the user can exclude (or erase) an unnecessary function within a range within which the software can be cut in a unit of a block of the memory (ROM), but if the user wants later, the user can download the function to expand the functions of the portable telephone set. Accordingly, the memory space can be customized for each use. It is estimated that this is very effective when a program for functions of a portable telephone set is described entirely using the JAVA in the future. Different from the other program languages at present, the JAVA does not manage each handler (JAVA apple) with an absolute address. Accordingly, further subdivision than ever can be achieved with the JAVA. There is the possibility that subdivision using program languages at present may not be anticipated very much from the characteristics of the languages (a link of each handler cannot be cut readily).

It is to be noted that a ROM area portion to be rewritten need not necessarily be in a unit of a block. Rewriting into a ROM at present allows erasure in a unit of a block (several bits) and writing in a unit of a word (16 bits). However, a future ROM may allow erasure/writing in smaller units.

FIG. 3 illustrates a manner of use of a portable telephone set to which the present invention is applied. Referring to FIG. 3, the portable telephone set is generally denoted at 31 and is connected to a communication undertaker server 32 by radio. Further, the portable telephone set 31 is connected to a personal computer 33 of the user by a cable.

A modified program for bug fixation can be read into a RAM of the portable telephone set 31 from the personal computer 33 or the like through an external interface of the portable telephone set 31. Or, such a modified program for bug fixation may be downloaded from a communication network through the communication undertaker server 32. Further, the RAM of the portable telephone set 31 can be used not only for bug fixation but also for expansion of functions of the portable telephone set 31.

It is to be noted that, since the user manages the memory area that has conventionally been prevented from being accessed by the user, the security and the safety must be assured. The security is assured by an encryption process or the like between a data transmission section and the portable telephone set. Meanwhile, for rewriting of the memory, much attention is paid on the hardware side.

While a preferred embodiment of the present invention has been described using specific terms, such description is for illustrative purposes only, and it is to be understood that changes and variations may be made without departing from the spirit or scope of the following claims.

What is claimed is:

1. A portable telephone in which bugs in a main program of the portable telephone can be corrected, the telephone comprising:

a read only memory in which the main program for the portable telephone is stored;

a volatile memory;

means for loading a patch into the volatile memory, the patch intended to be substituted for a portion of the main program which portion contains a bug; and means for copying the patch into the volatile memory to create a backup patch to be stored in the read only memory.

2. The portable telephone of claim 1, further comprising means for replacing the portion of the main program which contains the bug with the backup patch.

3. The portable telephone of claim 2, further comprising means for erasing the backup patch after it has replaced the portion of the main program which contained the bug.

4. The portable telephone of claim 1, wherein the main program stored in read only memory is stored in blocks.

5. The portable telephone of claim 4, wherein the main program stored in read only memory is rewritable in units of a block.

6. A portable telephone in which bugs in the main program of the portable telephone can be corrected, the telephone comprising:
   a read only memory in which a main program for the portable telephone is stored;
   a volatile memory;
   means for loading a patch into the volatile memory, the patch being used to correct a bug in the main program; and
   means for copying the patch into the volatile memory to create a backup patch, the backup patch being used to correct the bug in the read only memory.

7. A method for correcting bugs in a main program of a portable telephone stored in read only memory, the method comprising:
   periodically executing at least a portion of the main program;
   loading a patch which corrects a bug in the main program into the volatile memory;
   copying the patch into the volatile memory to create a backup patch; and
   substituting at least a portion of the main program stored in the read only memory of the telephone with the backup patch.

8. The method according to claim 7, wherein the backup patch is erased after it has replaced the portion of the main program which contained the bug.

9. The method according to claim 7, wherein the patch is transmitted to the portable telephone from a communications network.

10. The method according to claim 7, wherein the patch is transmitted to the portable telephone from a personal computer.

* * * * *